(12) United States Patent
Tailor

(10) Patent No.: US 8,505,000 B2
(45) Date of Patent: Aug. 6, 2013

(54) COMPILATION METHOD WITHOUT EXPLICIT SYMBOL TABLE FOR SAVING MEMORY

(75) Inventor: Mahendra Tailor, Wembley (GB)

(73) Assignee: Ezurio Limited, Woodburn Green, Bucks (GB)

( * ) Notice: Subject to any disclaimer, the term of this patent is extended or adjusted under 35 U.S.C. 154(b) by 828 days.

(21) Appl. No.: 12/670,092

(22) PCT Filed: Jul. 24, 2008

(86) PCT No.: PCT/GB2008/002535
§ 371 (c)(1),
(2), (4) Date: Jan. 21, 2010

(87) PCT Pub. No.: WO2009/013498
PCT Pub. Date: Jan. 29, 2009

(65) Prior Publication Data
US 2010/0223601 A1  Sep. 2, 2010

(30) Foreign Application Priority Data
Jul. 24, 2007  (GB) .................................. 0714441.3

(51) Int. Cl.
*G06F 9/45*  (2006.01)
(52) U.S. Cl.
USPC ........... 717/139; 717/140; 717/141; 717/142; 717/143; 717/144
(58) Field of Classification Search
None
See application file for complete search history.

(56) References Cited

U.S. PATENT DOCUMENTS

| | | | | |
|---|---|---|---|---|
| 5,193,180 A | * | 3/1993 | Hastings | 717/163 |
| 5,615,369 A | * | 3/1997 | Holler | 717/158 |
| 5,694,539 A | * | 12/1997 | Haley et al. | 714/38.1 |
| 5,857,071 A | * | 1/1999 | Haley et al. | 714/38.1 |
| 5,968,113 A | * | 10/1999 | Haley et al. | 714/38.1 |
| 6,038,397 A | * | 3/2000 | Iwanishi et al. | 717/154 |

(Continued)

FOREIGN PATENT DOCUMENTS

| | | |
|---|---|---|
| WO | WO 2004/017575 | 2/2004 |
| WO | WO 2007/000588 | 1/2007 |

OTHER PUBLICATIONS

International Search Report from PCT Application No. PCT/GB2008/002535 (published as WO 2009/013498) dated Oct. 30, 2008; 2 pgs. The instant application is a national phase of PCT/GB2008/002535 (WO 2009/013498).

(Continued)

*Primary Examiner* — Henry Tsai
*Assistant Examiner* — Jing-Yih Shyu
(74) *Attorney, Agent, or Firm* — Harness, Dickey & Pierce, P.L.C.

(57) ABSTRACT

There is described a method of compiling source code for a computer program into corresponding object code. The source code includes several declared variables. The method comprises, for each declared variable in the source code, including in the object code a declaration statement indicating an associated memory location for that variable and indicating the position in the object code of the next declaration statement. During compilation, the memory location for each declared variable can be retrieved from the object code by examining each declaration statement in turn, using the position information from each declaration statement to locate the next declaration statement. This is of particular advantage where the available volatile memory is limited, because there is no requirement for a look-up table of variables against memory locations.

20 Claims, 2 Drawing Sheets

U.S. PATENT DOCUMENTS

| | | | | |
|---|---|---|---|---|
| 6,079,031 | A * | 6/2000 | Haley et al. | 714/38.1 |
| 6,106,571 | A * | 8/2000 | Maxwell | 717/131 |
| 6,154,876 | A * | 11/2000 | Haley et al. | 717/133 |
| 6,260,191 | B1 * | 7/2001 | Santhanam | 717/114 |
| 6,634,021 | B2 * | 10/2003 | Santhanam | 717/151 |
| 6,880,154 | B2 * | 4/2005 | Ghosh et al. | 717/151 |
| 7,213,238 | B2 * | 5/2007 | Klarer et al. | 717/140 |
| 7,357,332 | B2 * | 4/2008 | Dravnieks et al. | 235/494 |
| 7,421,680 | B2 * | 9/2008 | DeLine et al. | 717/126 |
| 7,546,576 | B2 * | 6/2009 | Egli | 717/106 |
| 7,797,690 | B2 * | 9/2010 | Nesbitt et al. | 717/153 |
| 2002/0035676 | A1 * | 3/2002 | Weeks | 711/170 |
| 2003/0041318 | A1 * | 2/2003 | Klarer et al. | 717/140 |
| 2003/0221186 | A1 * | 11/2003 | Bates et al. | 717/125 |
| 2005/0251621 | A1 * | 11/2005 | Theis | 711/118 |
| 2006/0243787 | A1 * | 11/2006 | Dravnieks et al. | 235/100 |
| 2008/0086721 | A1 * | 4/2008 | Dravnieks et al. | 717/124 |

OTHER PUBLICATIONS

Fraser C W et al: "A Code Generation Interface for Ansi C" Software Practice & Experience, Wiley & Songs, Bognor Regis, GB, vol. 21, No. 9, Sep. 1, 1991 pp. 963-988, 27 pages.

Nelson P A: "A comparison of PASCAL intermediate languages" SIGPLAN Notices Use, vol. 14, No. 8, Aug. 1979, pp. 208-213, 6 pages.

Frantisek Franek: "Memory as a Programming Concept in C and C++ (chapter 2)"; 2004, Cambridge University Press, p. 7—paragraph 1, p. 14—paragraph 1, Figures 2.1, 2.3 and 2.4.

* cited by examiner

COMPILATION METHOD WITHOUT EXPLICIT SYMBOL TABLE FOR SAVING MEMORY

CROSS REFERENCE TO RELATED APPLICATIONS

This application is a 371 of PCT International Application No. PCT/GB2008/002535 filed Jul. 24, 2008, published as WO 2009/013498 on Jan. 29, 2009, which claims priority to Great Britain Patent Application No. 0714441.3 filed Jul. 24, 2007. The entire disclosures of the above applications are incorporated herein by reference in their entirety.

FIELD OF THE INVENTION

The present invention relates to a method of compiling source code for a computer programme into corresponding object code.

BACKGROUND OF THE INVENTION

Our international patent application WO 2007/000588 discloses an interface device for enabling wireless data communication between a host device and a remote device. The interface device has a host serial interface which is connected to the host device and a wireless interface for wireless data communication with the remote device. The interface device also has a wireless interface controller which is configured to control the operation of the wireless interface to enable data communication between the host device and the remote device via the interface device. A memory in the interface device stores a script based computer program and an interpreter reads successive program commands from the memory and converts the program commands into corresponding control commands for the wireless interface controller. The interface device has the advantage that the same script program may be used to operate interface devices using different wireless interface protocols simply by configuring the interpreter.

In a device of the kind described in WO 2007/000588, it is possible for the interpreter to process and execute each command of a stored source code computer program, such as a BASIC computer program. However, for the efficient use of the processing resources of the interface device, it is desirable to generate a compiled object code version of the computer program that can be interpreted more efficiently by the interpreter. In this way, it is not necessary for each command of the source code computer program to be interpreted each time the computer program is run. In general, this will increase the speed of operation of the computer program.

One possibility would be to compile the computer program on a host computer and upload a compiled version of the computer program to the interface device. In this case, the compiler on the host computer may require knowledge of how the commands of the computer program should be executed on the particular wireless interface controller to which the compiled version of the computer program e is to be uploaded. This can mean that the compiled version of the computer program is specific to the particular type of wireless interface controller. However, a major advantage of the device disclosed in WO 2007/000588 over devices such as the serial adapter disclosed in WO 2004/017575, is that the control commands for the wireless interface are independent of the protocol, e.g. Bluetooth, ZigBee, Wibree, Wi-Fi, IEEE 802.15.4 etc. that is used for wireless communication. If compilation is carried on a host computer, this independence is lost.

It is therefore desirable for any compiled version of the computer program to be generated on board the interface device. In this case, however, compilation must be carried out using the processing resources of the wireless interface controller. For reasons of cost and size, the processing resources of the wireless interface controller are likely to be significantly more limited than those of a typical personal computer, for example. In particular, providing random access memory on a wireless interface controller device is relatively expensive. It is therefore highly desirable to minimize the requirement for random access memory.

According to a typical prior art compilation process, during compilation a look-up table is maintained in memory which relates the variable names used in the computer program to the memory locations in which the values of those variables are stored. Sufficient memory must be provided to accommodate this look-up table, even where the program includes a large number of variables. Thus, according to the prior art, the provision of an onboard compiler in an interface device, such as that disclosed in WO 2007/000588, requires the provision of sufficient memory to maintain a variable look-up table during compilation. This amount of memory may not be required for any other purpose during operation of the interface device, which means that the provision of an onboard compiler may significantly increase the cost of the wireless controller device.

This invention seeks, at least in its preferred embodiments, to solve the problem of providing an onboard compiler in an interface device with limited available operating memory of the kind described in WO 2007/000588.

SUMMARY OF THE INVENTION

According to the present invention, there is provided a method of compiling source code for a computer program into corresponding object code. The source code includes a plurality of declared variables. The method comprises, for each declared variable in the source code, including in the object code a declaration statement indicating an associated memory location for that variable and indicating the position in the object code of the next declaration statement. Thus, during compilation, the memory location for each declared variable can be retrieved from the object code by examining each declaration statement in turn, using the position information from each declaration statement to locate the next declaration statement.

According to the invention, the object code itself is used, in effect, as a look-up table for the memory locations of the variables. In this way, it is not necessary to provide additional memory to store such a look-up table, which is a significant advantage, for example for an onboard compiler for a wireless interface device. During compilation, when the compiler is required to include the memory location for a particular variable in the object code, it is only necessary for the compiler to step through each declaration statement in the object code created so far in order to identify the declaration statement for the variable in question and the corresponding memory location. Each declaration statement includes the position of the next declaration statement, so that it is not necessary for the compiler to step through every command in the object code; the compiler can skip to the next declaration statement. This provides an efficient method of retrieving memory locations for the declared variables.

It is possible for each declaration statement to indicate an absolute position of the next declaration statement. For example, the exact memory location of each declaration statement may be stored in the preceding declaration statement. In the presently preferred embodiment, however, the declaration statement indicates the relative position of the next declaration statement. Thus, the declaration statement indicates the offset in terms of numbers of memory locations from the start of the object code of the next declaration statement. During compilation, each declaration statement is initially created with a blank relative position for the next declaration statement, because it is not yet known when, if at all, the next declaration statement will occur in the source code. The position value in the preceding declaration statement is created when the next declaration statement is created (or the end of the object code is reached). The use of a relative position is advantageous, because it is independent of the absolute location of the object code in memory.

In the preferred embodiment, the object code is stored in non-volatile memory as it is generated from the source code. In this way, non-volatile memory, such as flash memory, may be used to store both the object code and the variable memory locations stored within it.

The invention extends to a data processing device adapted to operate in accordance with the method described above. The data processing device may be as described generally in WO 2007/000588. For example, the data processing device may comprise a host interface connectable to a host device to provide data communication between the data processing device and a host device. The data processing device may comprise a wireless interface capable of wireless data communication with at least one remote device. The data processing device may comprise a wireless interface controller configured to control the operation of the wireless interface to enable data communication between the host interface and the wireless interface.

The data processing device may comprise a compiler arranged to generate object code from source code. The data processing device may comprise a memory arranged to store the object code. The memory may be arranged further to store the source code. Thus, source code may be uploaded to the data processing device, stored and subsequently compiled. Alternatively, the source code may be compiled as it is uploaded, for example from the host device, and only the object code stored in the memory. The memory may be volatile or non-volatile, for example flash memory. The source code may be loaded into the memory via the host interface or the wireless interface. Alternatively, the source code may be loaded directly into the memory during manufacture of the interface device.

It is possible for object code to be configured such that the wireless interface controller can process the object code directly. However, the data processing device may comprise an interpreter configured to read successive program commands of the object code from the memory, to convert the program commands into corresponding control commands for the wireless interface controller and to communicate the control commands to the wireless interface controller for execution.

The data processing device may comprise a microprocessor. The microprocessor may be configured to operate as the wireless interface controller, the interpreter and/or the compiler. For example, integrated circuits are known which include a microprocessor, memory, a radio transceiver and wireless baseband signal processing components.

Where the interpreter and the wireless interface controller are provided by a single microprocessor, the microprocessor may be arranged to process program commands from the object code between instructions required by the operation of the wireless interface controller. In this way, the operation of the interpreter may be interleaved with the operation of the wireless interface controller on a single microprocessor. Such an arrangement allows the interpreter to run on the microcontroller without negatively affecting the wireless interface performance of the microprocessor.

In particular, the interpreter and/or the compiler may run in a virtual machine. In this case, the microprocessor may multitask with threads being used to control the baseband and radio at the same time as the interpreter and/or the compiler operates. The interpreter should not interrupt the radio processing. However, the interpreter may run through scripts, for example filling arrays, testing loops, reading input/output, talking to the host interface at the same time as the wireless interface is operating. This feature may be implemented in a number of different ways, for example, using a virtual machine or a multithreaded, embedded operating system. In each case, the interpreter can run concurrently with the radio. This has the advantage that it allows data operations to be prepared at the same time as the radio is operating. For example, when the interface device is connected to a transducer the interpreter may run a program that calibrates and scales the transducer so that as soon as the radio becomes free this information can be sent over the radio link. This significantly reduces the latency of a single threaded approach, which in turn means that data can be sent more frequently, enhancing the duty cycle. This is particularly important with wireless standards such as Wi-Fi, Bluetooth, Wibree and ZigBee, where the data rate over the air can be in excess of 100 kbps. Whereas the slow GPRS rates of 10 kbps to 20 kbps allow more time for processing between radio transmissions, the higher data rates of Bluetooth, Wibree, ZigBee and Wi-Fi are best operated with concurrent processing.

A presently preferred language for the source code is a derivative of BASIC, as this is familiar to a wide range of programmers. However, other such high-level languages would also be suitable.

In addition to program commands that require conversion to control commands for the wireless interface controller, the source code may include program flow commands that do not require conversion but are processed by the interpreter. Such program commands include program flow commands (for example to create loops, call subroutines or jump to other parts of the program), mathematical operations, conditional and logical statements and variable definitions. Thus, the interpreter may be configured to process program commands which have no direct effect on the operation of the wireless interface.

The wireless interface may be configured to operate in accordance with any desired protocol. For example, the wireless interface may be a Bluetooth, Wibree, ZigBee or Wi-Fi interface. However, the invention is not limited to short range communication protocols. Longer range communications protocols such as GSM, GPRS, CDMA, 3 G or EV-D0 may also be used with appropriate wireless interfaces. It is also possible for the wireless interface to operate in accordance with multiple protocols or for the interface device to include multiple wireless interfaces.

The host interface may be any suitable interface. In particular, the host interface may be a serial interface, for example a USB interface. Typically the host interface is a wired interface. However, it is also possible for the host interface to be a wireless interface.

In general, the interface device is physically configured as a single unit. Thus, the interface device may comprise a housing which contains the host interface, wireless interface, wireless interface controller, memory, interpreter and compiler.

The invention also extends to computer software which when run on a general purpose microprocessor configures the microprocessor to operate in accordance with the method described herein.

Viewed from a broad further aspect, the invention provides object code comprising a declaration statement for each declared variable indicating an associated memory location for that variable and indicating the position in the object code of the next declaration statement.

According to the present invention, it is possible for the language and the content of the source code to be independent of the hardware configuration of the interface device, because the compiler can be configured to generate the source code to achieve the desired result with the particular hardware of the wireless controller. Thus, the same computer program may control the operation of an interface device using a Bluetooth wireless interface or an interface using a ZigBee wireless interface, because the on-board compiler is configured to convert the program commands to the correct control commands for the particular wireless interface controller. Alternatively, the object code may be generic to all wireless protocols and an interpreter may be provided to translate the object code into the required control commands.

BRIEF DESCRIPTION OF THE DRAWINGS

An embodiment of the invention will now be described by way of example only and with reference to the accompanying drawings, in which.

DETAILED DESCRIPTION OF EXEMPLARY EMBODIMENTS

Figure 1:
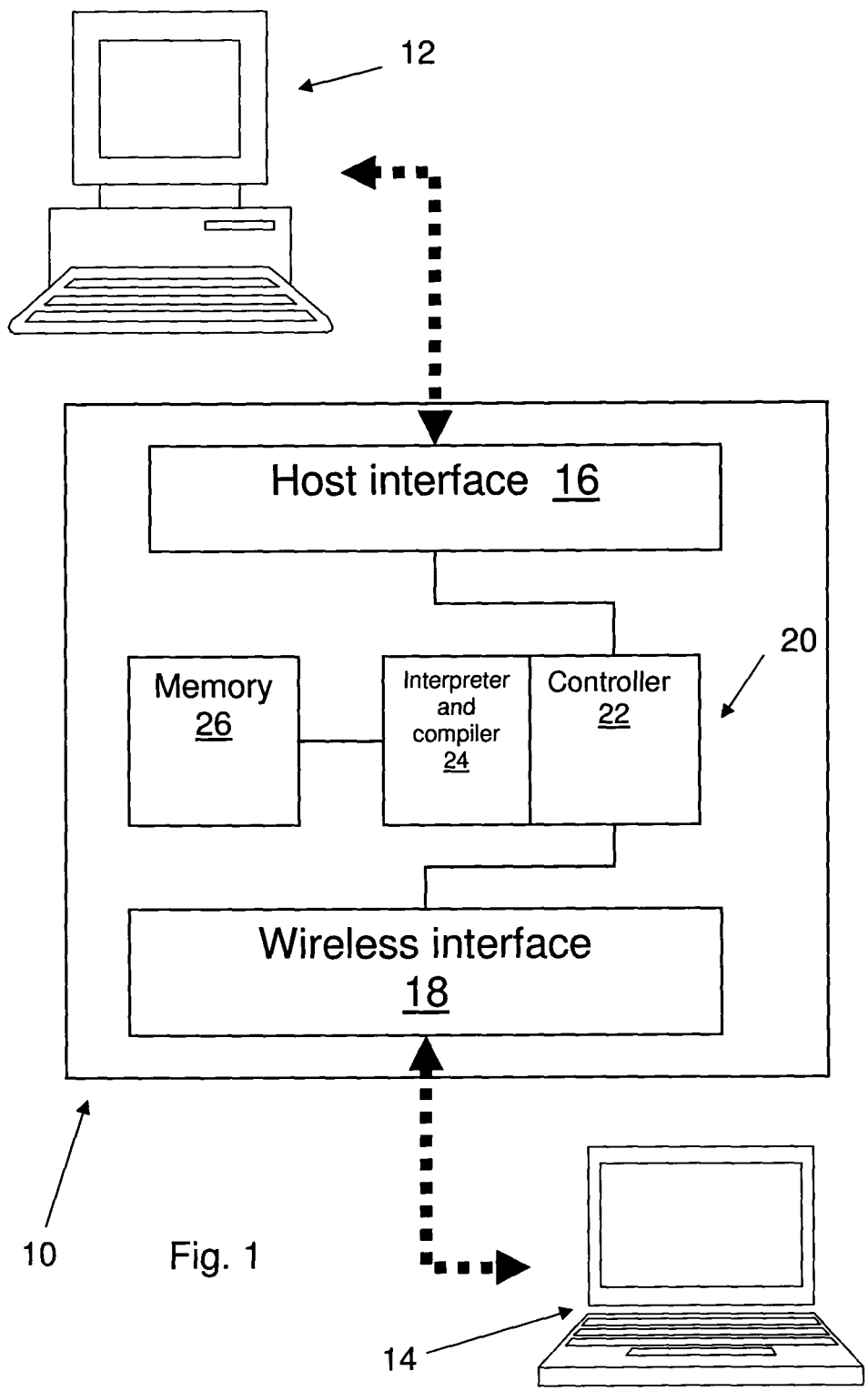
FIG. 1 is a schematic representation of an interface device for implementing an embodiment of the invention.

FIG. 1 is a schematic representation of an interface device 10 for implementing an embodiment of the invention. The interface device 10 is connected between a host device 12, shown in this case as a personal computer, and a remote device 14, shown in this case as a laptop computer with a wireless connection.

The interface device comprises a host interface 16 and a wireless interface 18. The host interface 16 and the wireless interface 18 are in data communication with a microprocessor 20. The microprocessor 20 is configured to operate a wireless interface controller 22 for controlling the operation of the wireless interface 18 to facilitate data transfer between the host interface 16 and the wireless interface 18 and vice versa. The microprocessor 20 is further configured to operate as an interpreter and compiler 24 and to this end is in data communication with a memory 26 which is arranged to store computer programs in the form of object code, and optionally as source code in the form of scripts.

The host interface 16 in this embodiment is a serial interface in the form of a USB (universal serial bus) interface connected to the host computer 12 via a USB cable. The host computer 12 is able to send and receive data and control commands via this interface 16 for communication to the wireless interface controller 22, where the data is forwarded via the wireless interface 18 to the remote computer 14.

The wireless interface 18 in this embodiment is a Bluetooth interface. Thus, the wireless interface 18 includes a radio transceiver, baseband controller, link manager and host controller interface, in accordance with the Bluetooth specification. The higher level operations of the wireless interface 18 are controlled by the wireless interface controller 22 on the microprocessor 20.

The microprocessor 20 also runs an interpreter 24, which reads commands from object code stored in the memory 26. Each command in the object code is processed by the interpreter 24 and converted as necessary to control commands for the wireless interface controller 22, which are then processed by the wireless interface controller 22. In general, the object code also includes program commands that do not require conversion to control commands. Such program commands may be program flow commands, conditional statements, variable definitions, mathematical operations and the like.

The interpreter 24 is configured to convert object code commands into the appropriate control commands for wireless interface controller 22 dependent on the type of wireless interface used. In the present embodiment, the object code commands are converted to control commands for the Bluetooth wireless interface 18. However, if the interface device 10 incorporates a ZigBee or Wi-Fi wireless interface 18, for example, the object code commands are converted to control commands appropriate to the respective interface.

With the interpreter 24 running on the same microprocessor 20 as the wireless interface controller 22, it is important that the operation of the controller 22 is not impeded by the operation of the interpreter 24. To prevent this, the interpreter 24 is configured to process the program commands of the object code in sequence when there is available processing capacity from the microprocessor 20. Because the object code uses a sequence of discrete commands, the microprocessor 20 can be configured such that the interpreter 24 processes one program command and then control of the microprocessor returns to the controller 22 to process any outstanding control commands. In this way the operation of the interpreter 24 is interleaved in time with the operation of the controller 22 by the microprocessor 20. Alternatively, the microprocessor 20 can be configured so that instructions from the controller 22 take precedence over instructions from the interpreter 24. The interpreter 24 may run in a virtual machine such that the interpreter 24 is multitasking with the threads being used to control the baseband and radio.

The interface device 10 according to this embodiment of the invention may be implemented using commercially-available hardware. For example, the BlueCore4-Ext Bluetooth device available from Cambridge Silicon Radio of Cambridge, United Kingdom incorporates a 2.4 GHz radio, baseband digital signal processing, random access memory, microprocessor and input/out control on a single-chip. Thus, the invention may be implemented on this chip by programming the microprocessor to run an interpreter in addition to the existing control of the Bluetooth wireless communication. The BlueCore4-Ext has an interface for an external flash memory which may be used in addition to the on-board RAM to store object code in accordance with the invention.

Alternatively, the CC1010 integrated RF transceiver and microcontroller available from Texas Instruments incorporates a 8051-compatible microprocessor, SRAM, flash memory and an RF transceiver on a single chip. This device may also be programmed to operate in accordance with the invention by programming the microprocessor to operate as both an interpreter and a wireless interface controller.

Figure 2:
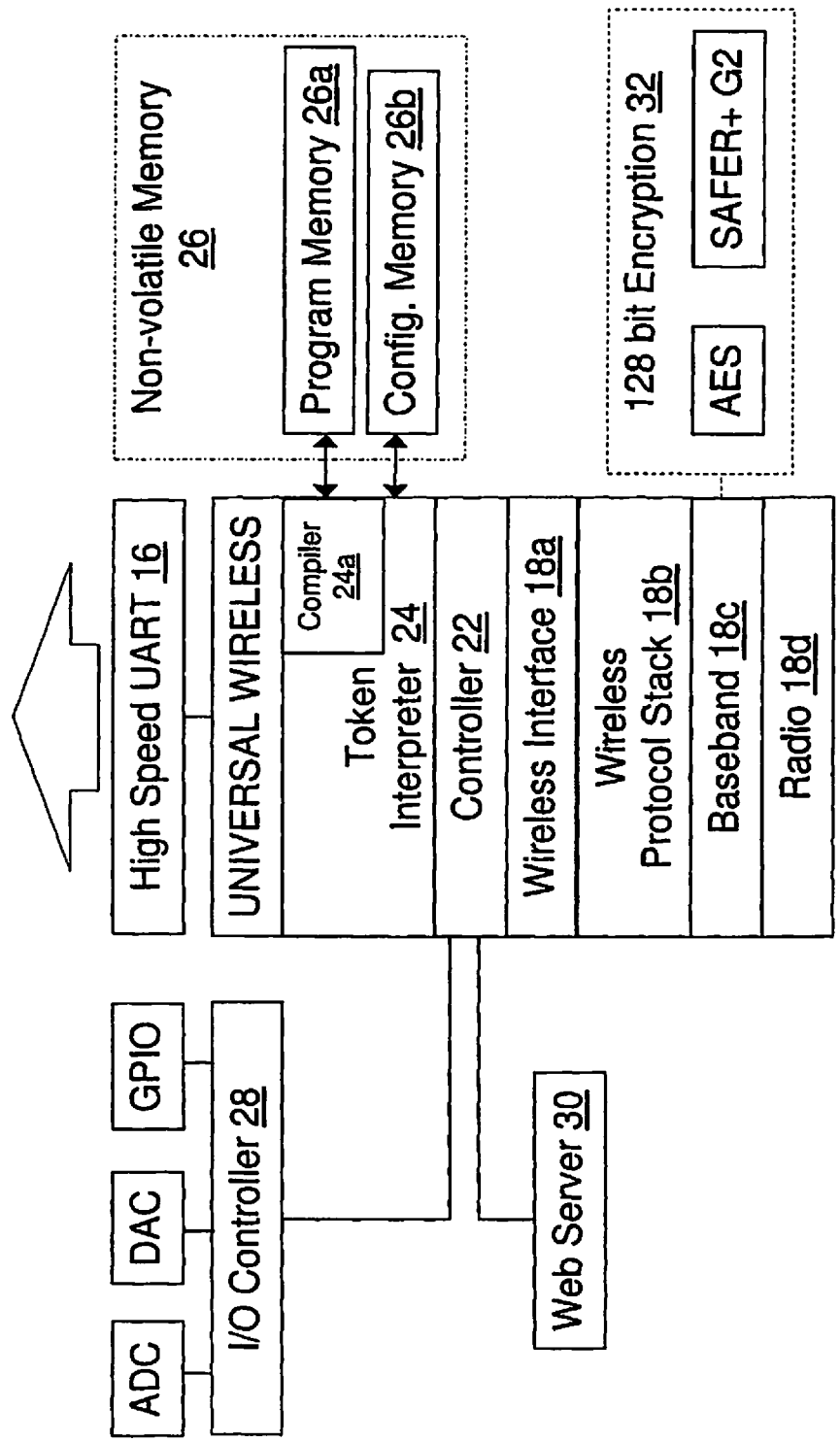
FIG. 2 is a detailed schematic view of the architecture of an interface device for implementing an embodiment of the invention.

FIG. 2 shows a detailed schematic view of the architecture of an embodiment of the invention. In this embodiment, the host interface 16 is in the form of a high speed UART (universal asynchronous receiver transmitter) interface. However, the interface device also includes ADC (analogue to digital converter), DAC (digital to analogue converter) and GPIO (general purpose input output) interfaces which communicate with the wireless interface controller 22 via an input output controller 28. The interface device 10 of this embodiment also includes a web server 30 which is in direct data communication with the wireless interface controller 22. It is not necessary for the module to use the UART port for operation. For example, the module may process data from other sources, such as the ADC input or GPIO. An example of an application of this approach is an internet thermostat that is programmed at manufacture and then runs autonomously.

The host device 12 communicates via the host interface 16 with a universal wireless layer that controls communications to the interpreter 24 and the controller 22. According to the invention, the device includes a token interpreter 24 and a compiler 24a, which generates object code for storage in the non-volatile memory 26. The non-volatile memory 26 includes a program memory 26a for storing object code for interpretation by the interpreter 24 and a configuration memory 26b for storing configuration data for the interpreter 24 and, optionally, for other components of the interface device 10.

In this embodiment, the wireless interface 18 comprises a wireless interface 18a for the wireless controller 22 as well as a wireless protocol stack 18b, a baseband processor 18c and a radio transceiver 18d. The baseband processor 18c is in data communication with a 128-bit encryption device 32 operating in accordance with the appropriate wireless standard of the interface, i.e. Advanced Encryption Standard (AES) for Wi-Fi, ZigBee and Wibree or, Safe and Fast Encryption Routine (SAFER+) and the G2 standard for Bluetooth.

An example of source code that may be processed in accordance with the invention is shown in Annex 1. In this example, for simplicity, the source code only includes variable declarations. For a typical exemplary program, however, the source code would include additional commands interspersed amongst the variable declarations. In this example there are two classes of variable: simple and complex. There are four types of simple variables: UWORD, SWORD, ULONG and SLONG. Where UWORD is an unsigned 16 bit integer, SWORD is a signed 16 bit integer, ULONG is an unsigned 32 bit integer and SLONG is a signed 32 bit integer. There is one type of complex variable, STRING, which is used to manipulate strings. All variables have a name and scope. Names begin with 'A' to 'Z' or '_' and then can have any combination of 'A' to 'Z', '0' to '9' and '_'. Variables names are case insensitive. Each variable can have one of three scopes: SUPER, GLOBAL and LOCAL. A super variable is one that is declared as global in the factory default. A global variable is a variable that is declared outside a function or subroutine block. A local variable is one which is declared within a function or subroutine block and it can have the same name as a global or super variable and in which case, it will take precedence when referenced in a function or subroutine block. A variable cannot be referenced before it is declared.

In Annex 1, the DECLARE statement is used to declare one or more variables. If the statement is within the confines of a function or subroutine then the declared variables have local scope, otherwise they can be referenced anywhere. When the variable is declared as an array (only one dimension is allowed) it must be referenced in the script source DECLARE statement with [x] where 'x' is an integer constant. When the variable is referenced in an expression it is indexed using the [x] syntax and in this case 'x' can either be an integer constant or a variable. In fact, if it is a variable index and it was also declared as an array, then it should also specify the [x]. This can be used recursively.

In Annex 1, the following variables are declared:

| Variable Name | Type |
|---|---|
| var1 | UWORD |
| ssid | STRING |
| ssie[5] | STRING |
| sids | STRING |
| varR | UWORD |
| vONE, | UWORD |
| vTWO, | SWORD |
| vTHREE | ULONG |
| arVar[33] | UWORD |
| arVar4[4], | UWORD |
| vSec | SWORD |
| _123456789012345 | SWORD |
| Intercom: | ULONG |
| SerialBrowseT | SLONG |

It will be seen that variables ssie, arVar and arVar4 are arrays of length 5, 33 and 4, respectively.

Annex 2 shows the object code generated from the source code of Annex 1 by the compiler 24a. The object code is made up of a sequence of 16-bit values, which are arranged into "p-codes". Each p-code is made up of three fields: a 4-bit length field, a 4-bit context field, which can include data, and an 8-bit identification field. Every p-code is 16 bits in length. The identification field identifies to the interpreter 24 the operation to be carried out on the basis of the p-code. The length field tells the interpreter 24 the total number of memory locations associated with the particular p-code, so that the interpreter 24 knows which subsequent memory locations include data for the preceding p-code, and when to expect the next p-code. The context field can include additional arguments for the p-code.

The first p-code in Annex 2 (at memory location 0000) is 70FE. This has the identifier FE (decimal 254), which is HEADER, has a length of seven memory locations and a zero context value. The interpreter 24, when processing the object code, reads this first p-code and processes the next six memory locations in accordance with the predefined protocol for the HEADER p-code. Thus, the six memory locations represent the software version, the total object code file size, the size of the memory block for simple variables, the size of the memory block for complex variables, the offset to the first variable declaration and the offset to the first label (for program flow commands).

The next p-code in Annex 2 (at memory location 0007) is 10FC. This has the identifier FC (decimal 252), which is SCRIPTNAME, a length of only one memory location and a zero context value. This p-code, when processed by the interpreter 24, informs the interpreter 24 to expect the next p-code to be a string constant representing the script name. Thus, the next p-code in Annex 2 (at memory location 0008) is 90FB. This has the identifier FB (decimal 251), which is STR-CONST, a length of nine memory locations and a zero context value. This p-code, when processed by the interpreter 24, informs the interpreter 24 to expect the following memory locations to define a string constant. The first subsequent memory location (0009) contains the length of the string (13 characters in this case) and the subsequent seven memory locations contain the values of the characters, two at a time, to give a script name of "BASDECLARE.PC".

The next p-code (at memory location 0011) is 1001. This has the identifier 01 (decimal 001), which is STATEMENT, a length of one memory location and a zero context value. The STATEMENT p-code indicates that the subsequent p-code is a command statement.

The subsequent p-code (at memory location 0012) is 6080. This has the identifier 80 (decimal 128), which is DECLARE, a length of six memory locations and a zero context value. The interpreter 24, when processing the object code, reads this p-code and processes the next five memory locations in accordance with the predefined protocol for the DECLARE p-code. Thus, the five memory locations represent the offset to the next variable declaration, a search hash for the variable, the address offset into the simple or complex memory block for the memory location of that variable, the variable type and the array length of the variable.

The next p-code in Annex 2 (at memory location 0018) is 40FB. This has the identifier FB (decimal 251), which is STRCONST, a length of four memory locations and a zero context value. This p-code, when processed by the interpreter 24, informs the interpreter 24 to expect the following memory locations to define a string constant, which in this case represents the variable name. The first subsequent memory location (0019) contains the length of the string (4 characters) and the subsequent two memory locations contain the values of the characters, two at a time, to give a variable name of "VAR1".

All of the variable declarations in the object code follow the format of STATEMENT, DECLARE, STRCONST, as will be seen from Annex 2. The final p-code in the object code is 10FD, which is an END statement.

It will be seen that the header p-code is followed by a value for the location (0012) of the first DECLARE p-code in the object code. The first DECLARE p-code is followed by a value for the location (001d) of the next DECLARE p-code, and so on for each DECLARE p-code. Thus, it is possible during compilation to step through the stored object code so far compiled to read out the memory location for each variable. In effect, the object code itself stores the variable table shown in Annex 3.

Typically, the object code will include other p-codes, corresponding to other commands in the source code. Nevertheless, the variable locations can still be read out of the object code using the offsets in each DECLARE statement.

Although the host device 12 and remote device 14 have been shown as computers in FIG. 1, it is not necessary for these devices to have any significant onboard processing power to operate with the interface device 10 of the invention. It is only necessary that the host device has an interface that is compatible with the host interface 16, such as a USB port and that the remote device has an interface that is compatible with the wireless interface 18, such as a Bluetooth interface. Thus, the invention has many applications, such as data logging from embedded systems in vending machines, cars and the like.

An example application might be the case of a vending machine which an engineer visits with a PDA (personal digital assistant). According to the prior art, the engineer connects the PDA to a serial port on the vending machine and runs a program on the PDA to download data. Using the interface device of the invention with a Wi-Fi wireless interface, say, the download program can be replicated as a script in the memory of the interface device together with the details of making a Wi-Fi connection. The host interface of the interface device is connected to the existing serial port of the vending machine. When the interface device powers up, it connects to a remote IP address using a local Wi-Fi access point and goes into a standby mode. The download program can either be triggered by an internal timer in the interface device, a general purpose signal input line or remotely from the internet. At which point the data is downloaded and sent to a remote monitoring program which logs it. The important point is that no changes need to be made to the vending machine—all that is required is to attach the interface device to the serial port. The module is in effect a remote, self-contained data logger that fully emulates the engineer's PDA.

Further applications include: credit card readers that support multiple radio interface options so that the radio interface can be chosen at final assembly; peripherals, such as "processor-free" modem boxes or "processor-free" keypads; cable replacement by providing pre-configured wireless adaptors for legacy ports; personal medical monitors; simple connections for medical diagnostic equipment to hospital networks and PDAs; automotive on board diagnostics; and in-car entertainment (mobile phone connectivity and Bluetooth audio connectivity).

The programs run by the interpreter may be used to implement wireless-specific interface protocols within the interface device, such as controller area network (CAN), local interconnect network (LIN) and IEEE 1451.5 protocols. This capability is of particular significance in the context of transducer interfacing, telemetry for modem interfacing and automotive diagnostics. Thus, the memory may store a library of application protocols, for example using transducer electronic datasheets (TEDS) for conversion between IEEE 1451.5 protocols and IEEE 1451.0 protocols, in accordance with the network capable applications processor (NCAP) or the wireless transducer interface model (WTIM).

In summary, there is described a method of compiling source code for a computer program into corresponding object code. The source code includes several declared variables. The method comprises, for each declared variable in the source code, including in the object code a declaration statement indicating an associated memory location for that variable and indicating the position in the object code of the next declaration statement. During compilation, the memory location for each declared variable can be retrieved from the object code by examining each declaration statement in turn, using the position information from each declaration statement to locate the next declaration statement. This is of particular advantage where the available volatile memory is limited, because there is no requirement for a look-up table of variables against memory locations.

---

ANNEX 1

'================ TEST : DECLARE ================
DECLARE UWORD var1
DECLARE STRING ssid
DECLARE STRING ssie[5]
DECLARE STRING sids
DECLARE UWORD varR
DECLARE UWORD vONE, SWORD vTWO, ULONG vTHREE
DECLARE UWORD arVar[33]
DECLARE UWORD arVar4[4], SWORD vSec
DECLARE SWORD _123456789012345
DECLARE ULONG Intercom:
DECLARE SLONG SerialBrowseT

ANNEX 2

```
'========================= TEST : DECLARE =============================
              0000:    0x70fe               [HEADER] (254)
              0001:    0x0001   (     1)              ;Version
              0002:    0x0117   (   279)              ;Pcode File Size
              0003:    0x0060   (    96)              ;Simple Global Block
              0004:    0x0007   (     7)              ;Complex Global Block
              0005:    0x0012   (    18)              ;First Var DECLARE offset
              0006:    0xffff   (65535)               ;First Label offset
              0007:    0x10fc                [SCRIPTNAME] (252)
              0008:    0x90fb                [STRCONST] (251)
              0009:    0x000d   (    13)
              000a:    0x4142   (16706)     AB
              000b:    0x4453   (17491)     DS
              000c:    0x4345   (17221)     CE
              000d:    0x414c   (16716)     AL
              000e:    0x4552   (17746)     ER
              000f:    0x502e   (20526)     P.
              0010:    0x0043   (    67)    C      [..BASDECLARE.PC.]
DECLARE UWORD var1
              0011:    0x1001                [STATEMENT] (   1)
              0012:    0x6080                [DECLARE] (128)
              0013:    0x001d   (    29)           ;Offset To Next Var
              0014:    0x0456   ( 1110)     V      ;Search Hash
              0015:    0x0000   (     0)           ;Address Offset into memory block
              0016:    0x0001   (     1)           ;Variable type : UWORD
              0017:    0x0001   (     1)           ;Array Length
              0018:    0x40fb                [STRCONST] (251)
              0019:    0x0004   (     4)
              001a:    0x4156   (16726)     AV
              001b:    0x3152   (12626)     1R     [..VAR1]
DECLARE STRING ssid
              001c:    0x1001                [STATEMENT] (   1)
              001d:    0x6080                [DECLARE] (128)
              001e:    0x0028   (    40)    (      ;Offset To Next Var
              001f:    0x0453   ( 1107)     S      ;Search Hash
              0020:    0x0000   (     0)           ;Address Offset into memory block
              0021:    0x0010   (    16)           ;Variable type : STRING
              0022:    0x0001   (     1)           ;Array Length
              0023:    0x40fb                [STRCONST] (251)
              0024:    0x0004   (     4)
              0025:    0x5353   (21331)     SS
              0026:    0x4449   (17481)     DI     [..SSID]
DECLARE STRING ssie[5]
              0027:    0x1001                [STATEMENT] (   1)
              0028:    0x6080                [DECLARE] (128)
              0029:    0x0033   (    51)    3      ;Offset To Next Var
              002a:    0x0453   ( 1107)     S      ;Search Hash
              002b:    0x0001   (     1)           ;Address Offset into memory block
              002c:    0x0010   (    16)           ;Variable type : STRING
              002d:    0x0005   (     5)           ;Array Length
              002e:    0x40fb                [STRCONST] (251)
              002f:    0x0004   (     4)
              0030:    0x5353   (21331)     SS
              0031:    0x4549   (17737)     EI     [..SSIE]
DECLARE STRING sids
              0032:    0x1001                [STATEMENT] (   1)
              0033:    0x6080                [DECLARE] (128)
              0034:    0x003e   (    62)    >      ;Offset To Next Var
              0035:    0x0453   ( 1107)     S      ;Search Hash
              0036:    0x0006   (     6)           ;Address Offset into memory block
              0037:    0x0010   (    16)           ;Variable type : STRING
              0038:    0x0001   (     1)           ;Array Length
              0039:    0x40fb                [STRCONST] (251)
              003a:    0x0004   (     4)
              003b:    0x4953   (18771)     IS
              003c:    0x5344   (21316)     SD     [..SIDS]
DECLARE UWORD varR
              003d:    0x1001                [STATEMENT] (   1)
              003e:    0x6080                [DECLARE] (128)
              003f:    0x0049   (    73)    I      ;Offset To Next Var
              0040:    0x0456   ( 1110)     V      ;Search Hash
              0041:    0x0001   (     1)           ;Address Offset into memory block
              0042:    0x0001   (     1)           ;Variable type : UWORD
              0043:    0x0001   (     1)           ;Array Length
              0044:    0x40fb                [STRCONST] (251)
              0045:    0x0004   (     4)
              0046:    0x4156   (16726)     AV
              0047:    0x5252   (21074)     RR     [..VARR]
```

ANNEX 2

```
DECLARE UWORD vONE,SWORD vTWO,ULONG vTHREE
        0048:   0x1001                  [STATEMENT] (   1)
        0049:   0x6080                  [DECLARE] (128)
        004a:     0x0053  (     83)     S       ;Offset To Next Var
        004b:     0x0456  (   1110)     V       ;Search Hash
        004c:     0x0002  (      2)             ;Address Offset into memory block
        004d:     0x0001  (      1)             ;Variable type : UWORD
        004e:     0x0001  (      1)             ;Array Length
        004f:   0x40fb                  [STRCONST] (251)
        0050:     0x0004  (      4)
        0051:     0x4f56  (  20310)     OV
        0052:     0x454e  (  17742)     EN      [..VONE]
        0053:   0x6080                  [DECLARE] (128)
        0054:     0x005d  (     93)     ]       ;Offset To Next Var
        0055:     0x0456  (   1110)     V       ;Search Hash
        0056:     0x0003  (      3)             ;Address Offset into memory block
        0057:     0x0002  (      2)             ;Variable type : SWORD
        0058:     0x0001  (      1)             ;Array Length
        0059:   0x40fb                  [STRCONST] (251)
        005a:     0x0004  (      4)
        005b:     0x5456  (  21590)     TV
        005c:     0x4f57  (  20311)     OW      [..VTWO]
        005d:   0x6080                  [DECLARE] (128)
        005e:     0x0069  (    105)     i       ;Offset To Next Var
        005f:     0x0656  (   1622)     V       ;Search Hash
        0060:     0x0004  (      4)             ;Address Offset into memory block
        0061:     0x0003  (      3)             ;Variable type : ULONG
        0062:     0x0001  (      1)             ;Array Length
        0063:   0x50fb                  [STRCONST] (251)
        0064:     0x0006  (      6)
        0065:     0x5456  (  21590)     TV
        0066:     0x5248  (  21064)     RH
        0067:     0x4545  (  17733)     EE      [..VTHREE]
DECLARE UWORD arVar[33]
        0068:   0x1001                  [STATEMENT] (   1)
        0069:   0x6080                  [DECLARE] (128)
        006a:     0x0075  (    117)     u       ;Offset To Next Var
        006b:     0x0541  (   1345)     A       ;Search Hash
        006c:     0x0006  (      6)             ;Address Offset into memory block
        006d:     0x0001  (      1)             ;Variable type : UWORD
        006e:     0x0021  (     33)     !       ;Array Length
        006f:   0x50fb                  [STRCONST] (251)
        0070:     0x0005  (      5)
        0071:     0x5241  (  21057)     RA
        0072:     0x4156  (  16726)     AV
        0073:     0x0052  (     82)     R       [..ARVAR.]
DECLARE UWORD arVar4[4] , SWORD vSec
        0074:   0x1001                  [STATEMENT] (   1)
        0075:   0x6080                  [DECLARE] (128)
        0076:     0x0080  (    128)             ;Offset To Next Var
        0077:     0x0641  (   1601)     A       ;Search Hash
        0078:     0x0027  (     39)     '       ;Address Offset into memory block
        0079:     0x0001  (      1)             ;Variable type : UWORD
        007a:     0x0004  (      4)             ;Array Length
        007b:   0x50fb                  [STRCONST] (251)
        007c:     0x0006  (      6)
        007d:     0x5241  (  21057)     RA
        007e:     0x4156  (  16726)     AV
        007f:     0x3452  (  13394)     4R      [..ARVAR4]
        0080:   0x6080                  [DECLARE] (128)
        0081:     0x008b  (    139)             ;Offset To Next Var
        0082:     0x0456  (   1110)     V       ;Search Hash
        0083:     0x002b  (     43)     +       ;Address Offset into memory block
        0084:     0x0002  (      2)             ;Variable type : SWORD
        0085:     0x0001  (      1)             ;Array Length
        0086:   0x40fb                  [STRCONST] (251)
        0087:     0x0004  (      4)
        0088:     0x5356  (  21334)     SV
        0089:     0x4345  (  17221)     CE      [..VSEC]
DECLARE SWORD _123456789012345
        00e7:   0x1001                  [STATEMENT] (   1)
        00e8:   0x6080                  [DECLARE] (128)
        00e9:     0x00f9  (    249)             ;Offset To Next Var
        00ea:     0x105f  (   4191)     _       ;Search Hash
        00eb:     0x005b  (     91)     [       ;Address Offset into memory block
        00ec:     0x0002  (      2)             ;Variable type : SWORD
        00ed:     0x0001  (      1)             ;Array Length
        00ee:   0xa0fb                  [STRCONST] (251)
```

ANNEX 2

```
        00ef:      0x0010     (   16)
        00f0:      0x315f     (12639)    1_
        00f1:      0x3332     (13106)    32
        00f2:      0x3534     (13620)    54
        00f3:      0x3736     (14134)    76
        00f4:      0x3938     (14648)    98
        00f5:      0x3130     (12592)    10
        00f6:      0x3332     (13106)    32
        00f7:      0x3534     (13620)    54        [.._123456789012345]
DECLARE ULONG Intercom:
        00f8:      0x1001                [STATEMENT] (   1)
        00f9:      0x6080                [DECLARE] (128)
        00fa:      0x0106     (  262)              ;Offset To Next Var
        00fb:      0x0849     ( 2121)    I         ;Search Hash
        00fc:      0x005c     (   92)    \         ;Address Offset into memory block
        00fd:      0x0003     (    3)              ;Variable type : ULONG
        00fe:      0x0001     (    1)              ;Array Length
        00ff:      0x60fb                [STRCONST] (251)
        0100:      0x0008     (    8)
        0101:      0x4e49     (20041)    NI
        0102:      0x4554     (17748)    ET
        0103:      0x4352     (17234)    CR
        0104:      0x4d4f     (19791)    MO        [..INTERCOM]
DECLARE SLONG SerialBrowseT
        0105:      0x1001                [STATEMENT] (   1)
        0106:      0x6080                [DECLARE] (128)
        0107:      0xffff     (65535)              ;Offset To Next Var
        0108:      0x0d53     ( 3411)    S         ;Search Hash
        0109:      0x005e     (   94)    ^         ;Address Offset into memory block
        010a:      0x0004     (    4)              ;Variable type : SLONG
        010b:      0x0001     (    1)              ;Array Length
        010c:      0x90fb                [STRCONST] (251)
        010d:      0x000d     (   13)
        010e:      0x4553     (17747)    ES
        010f:      0x4952     (18770)    IR
        0110:      0x4c41     (19521)    LA
        0111:      0x5242     (21058)    RB
        0112:      0x574f     (22351)    WO
        0113:      0x4553     (17747)    ES
        0114:      0x0054     (   84)    T         [..SERIALBROWSET.]
        0115:      0x1001                [STATEMENT] (   1)
        0116:      0x10fd                [END] (253)
```

ANNEX 3
Variable Map

| | NAME | TYPE | OFFSET | SPACE |
|---|---|---|---|---|
| 1: | var1 | UWORD | 0 | GLOBAL |
| 2: | ssid | STRING | 0 | GLOBAL |
| 3: | ssie | STRING | 1 | GLOBAL |
| 4: | sids | STRING | 6 | GLOBAL |
| 5: | varR | UWORD | 1 | GLOBAL |
| 6: | vONE | UWORD | 2 | GLOBAL |
| 7: | vTWO | SWORD | 3 | GLOBAL |
| 8: | vTHREE | ULONG | 4 | GLOBAL |
| 9: | arVar | UWORD | 6 | GLOBAL |
| 10: | arVar4 | UWORD | 39 | GLOBAL |
| 11: | vSec | SWORD | 43 | GLOBAL |
| 12: | _123456789012345 | SWORD | 91 | GLOBAL |
| 13: | Intercom | ULONG | 92 | GLOBAL |
| 14: | SerialBrowseT | SLONG | 94 | GLOBAL |

The invention claimed is:

1. A method of compiling source code for a computer program into object code, the method comprising:

for each of a plurality of declared variables in the source code, including in the object code a declaration statement indicating an associated memory location for that variable and indicating the object code location of the next declaration statement;

whereby, as the source code is being compiled into object code, the memory location for each of the plurality of declared variables can be retrieved from the object code by examining each declaration statement in turn, using the object code location information from a given declaration statement to locate the next declaration statement.

2. The method as claimed in claim 1, wherein the declaration statement indicates a relative location of the next declaration statement.

3. The method as claimed in claim 1, wherein the object code is stored in non-volatile memory as it is generated from the source code.

4. The method as claimed in claim 1, performed by a general purpose microprocessor of a data processing device, the microprocessor configured to operate as a wireless interface controller, interpreter, and compiler.

5. The method as claimed in claim 2, wherein the object code is stored in non-volatile memory as it is generated from the source code.

6. A data processing device configured to compile source code for a computer program into object code, the data processing device further configured to:

for each of a plurality of declared variables in the source code, include in the object code a declaration statement indicating an associated memory location for that variable and indicate the object code location of the next declaration statement;

whereby, as the source code is being compiled into object code, the memory location for each of the plurality of declared variables can be retrieved from the object code by examining each declaration statement in turn, using the object code location information from a given declaration statement to locate the next declaration statement.

7. The data processing device as claimed in claim 6, wherein the declaration statement indicates a relative location of the next declaration statement.

8. The data processing device as claimed in claim 6, wherein the object code is stored in non-volatile memory as it is generated from the source code.

9. A data processing device comprising:
a memory onboard the data processing device, and a compiler stored in the memory, the compiler configured to generate object code from source code without maintaining an explicit symbol table, the object code including a declaration statement for each of a plurality of variables declared in the source code, a given declaration statement indicating an associated memory location for the corresponding variable and indicating the object code location of the next declaration statement.

10. The data processing device according to claim 9, comprising:
a host interface configured for connection with a host device to provide data communication between the data processing device and the host device;
a wireless interface configured for wireless data communication with at least one remote device;
a wireless interface controller configured to control the operation of the wireless interface to enable data communication between the host interface and the wireless interface;
a memory arranged to store the object code; and
an interpreter configured to read successive program commands of the object code from the memory, to convert the program commands into corresponding control commands for the wireless interface controller and to communicate the control commands to the wireless interface controller for execution.

11. The data processing device according to claim 10, wherein the data processing device comprises a microprocessor and the microprocessor is configured to operate as the wireless interface controller, the interpreter and the compiler.

12. The data processing device according to claim 10, wherein the data processing device is configured to download interpreter scripts from the host device for storage in the data processing device.

13. The data processing device according to claim 11, wherein the data processing device is configured to download interpreter scripts from the host device for storage in the data processing device.

14. The data processing device according to claim 10, wherein:
the declaration statement indicates a relative location of the next declaration statement; and/or
the object code is stored in non-volatile memory as it is generated from the source code.

15. The data processing device according to claim 9, wherein:
the declaration statement indicates the relative location of the next declaration statement; and/or
the object code is stored in non-volatile memory as it is generated from the source code.

16. The data processing device according to claim 15, wherein the data processing device comprises a microprocessor and the microprocessor is configured to operate as a wireless interface controller, an interpreter and the compiler.

17. The data processing device according to claim 16, wherein the data processing device is configured to download interpreter scripts from a host device for storage in the data processing device.

18. A data processing device comprising:
a host interface configured for connection with a host device to provide data communication between the data processing device and the host device;
a wireless interface configured for wireless data communication with at least one remote device;
a wireless interface controller configured to control the operation of the wireless interface to enable data communication between the host interface and the wireless interface;
a compiler arranged to generate object code from source code;
a memory arranged to store the object code; and
an interpreter configured to read successive program commands of the object code from the memory, to convert the program commands into corresponding control commands for the wireless interface controller and to communicate the control commands to the wireless interface controller for execution; and
the data processing device is configured for compiling source code that includes a plurality of declared variables for a computer program into object code, such that for each of the plurality of declared variables in the source code, the object code includes a declaration statement indicating an associated memory location for that variable and indicating the object code location of the next declaration statement;
whereby, as the source code is being compiled into object code, the memory location for each of the plurality of declared variables can be retrieved from the object code by examining each declaration statement in turn, using the object code location information from a given declaration statement to locate the next declaration statement.

19. The data processing device according to claim 18, wherein:
the data processing device comprises a microprocessor and the microprocessor is configured to operate as the wireless interface controller, the interpreter and the compiler; and/or
the data processing device is configured to download interpreter scripts from the host device for storage in the data processing device.

20. The data processing device according to claim 18, wherein:
the declaration statement indicates a relative location of the next declaration statement; and/or
the object code is stored in non-volatile memory as it is generated from the source code.

* * * * *